United States Patent
Naot et al.

(10) Patent No.: US 10,023,454 B2
(45) Date of Patent: Jul. 17, 2018

(54) MULTICHANNEL LIQUID DELIVERY SYSTEM

(71) Applicant: Space Pharma SA, Delémont (CH)

(72) Inventors: Ira Naot, Zichron Yaacov (IL); Yair Feuchtwanger, Yokneam-Ilit (IL); Molly K. Mulligan, Troy, NY (US); Alexander Pekin, Ramat Gan (IL)

(73) Assignee: SpacePharma SA, Delémont (CH)

( * ) Notice: Subject to any disclaimer, the term of this patent is extended or adjusted under 35 U.S.C. 154(b) by 55 days.

(21) Appl. No.: 15/177,458

(22) Filed: Jun. 9, 2016

(65) Prior Publication Data

US 2017/0355584 A1   Dec. 14, 2017

(51) Int. Cl.
*B67C 3/18* (2006.01)
*B67C 3/28* (2006.01)

(52) U.S. Cl.
CPC . *B67C 3/18* (2013.01); *B67C 3/28* (2013.01)

(58) Field of Classification Search
CPC .................................. B67C 3/18; B67C 3/28
USPC ............................................... 141/21, 25, 26
See application file for complete search history.

(56) References Cited

U.S. PATENT DOCUMENTS

| | | | |
|---|---|---|---|
| 2,529,937 A * | 11/1950 | Hale | G03C 1/74 222/263 |
| 3,343,422 A * | 9/1967 | McSmith | B01L 3/021 222/386.5 |
| 3,572,552 A * | 3/1971 | Guinn | B01L 3/021 222/263 |
| 4,158,035 A | 6/1979 | Haase et al. | |
| 4,317,452 A | 3/1982 | Russo et al. | |
| 4,537,231 A * | 8/1985 | Hasskamp | B01L 3/021 141/130 |
| 5,085,345 A * | 2/1992 | Wells | B01L 3/021 141/114 |
| 5,343,909 A * | 9/1994 | Goodman | B01L 3/021 141/114 |
| 5,368,451 A * | 11/1994 | Hammond | F04B 43/0736 417/273 |
| 5,603,360 A * | 2/1997 | Teel | F17C 5/06 137/267 |
| 6,068,198 A * | 5/2000 | Gupta | B05B 9/047 141/27 |

(Continued)

OTHER PUBLICATIONS

International Search Report of International Application No. PCT/IL2017/050556 dated Aug. 13, 2017.

*Primary Examiner* — Timothy L Maust
(74) *Attorney, Agent, or Firm* — Pearl Cohen Zedek Latzer Baratz LLP

(57) ABSTRACT

A system includes rigid reservoirs, each divided by a flexible diaphragm into a hydraulic chamber and a delivery chamber. The hydraulic chamber is connected to a hydraulic liquid conduit via a valve and the delivery chamber is connected to a delivery conduit. A hydraulic actuator is operable to apply pressure to the hydraulic liquid so as to force the hydraulic liquid into a hydraulic chamber whose valve is open, pushing the diaphragm distally to force the delivery liquid from the delivery chamber into the connected delivery conduit. The actuator is also operable to apply suction to the hydraulic liquid in the hydraulic liquid conduit so as to draw hydraulic liquid from the hydraulic chamber, proximally pulling the flexible diaphragm to draw the delivery liquid from the delivery conduit into the delivery chamber.

5 Claims, 4 Drawing Sheets

(56) References Cited

U.S. PATENT DOCUMENTS

| | | | |
|---|---|---|---|
| 6,267,160 B1 * | 7/2001 | Viken | F01M 11/0458 141/65 |
| 6,644,364 B1 * | 11/2003 | Feygin | B01J 3/002 141/130 |
| 6,923,223 B2 * | 8/2005 | Trzmiel | F15B 1/103 138/30 |
| 9,541,236 B2 * | 1/2017 | Kuehl | F17C 5/06 |
| 2002/0168297 A1 * | 11/2002 | Shvets | B01L 3/021 422/400 |
| 2012/0059349 A1 * | 3/2012 | Kuo | A61M 5/1407 604/500 |
| 2015/0114515 A1 * | 4/2015 | Phallen | B67C 3/007 141/1 |

\* cited by examiner

MULTICHANNEL LIQUID DELIVERY SYSTEM

FIELD OF THE INVENTION

The present invention relates to liquid delivery systems. More particularly, the present invention relates to a multichannel liquid delivery system for use in a microgravity environment.

BACKGROUND OF THE INVENTION

In a traditional terrestrial environment, gravity and atmospheric pressure are often exploited to drive liquids from one vessel to another. For example, a source container may be placed higher than a destination container. The source container may be open to the ambient atmosphere such that gas pressure in gasses above the liquid level in the container may be equal to atmospheric pressure. A proximal opening to a conduit may be placed below the level of liquid in the container. Thus, when liquid is withdrawn from an opposite, distal opening of the conduit, atmospheric pressure may be relied upon to push liquid into the proximal end to replace the quantity of liquid that is withdrawn at the distal end.

Similarly, in the terrestrial environment, the force of gravity generally causes the liquid in a container to accumulate in a lower portion of the container or of another component of a fluid-handling system. Gasses such as air or vapor, being generally less dense than the liquid, accumulate in an upper portion of the container or component, above a liquid level. Therefore, liquid may be passively drained from the container or component via an opening that is placed below the liquid level. Structures to vent air bubbles, or that are otherwise open to the ambient atmosphere, may be placed above the liquid level.

In some cases, it may be desirable or advantageous to operate a process involving liquids in a microgravity environment. For example, an experimental or industrial process may be operated in a spacecraft in earth orbit or on a spacecraft travelling outside of earth orbit. The process may be controlled by a human operator on the spacecraft or remotely located, or may be controlled automatically.

SUMMARY OF THE INVENTION

There is thus provided, in accordance with an embodiment of the present invention, a system including: a plurality of rigid reservoirs, an interior space of each of the rigid reservoirs being divided by a flexible diaphragm into a hydraulic chamber and a delivery chamber, the hydraulic chamber being connected to a hydraulic liquid conduit via a valve, the delivery chamber being connected to a delivery conduit, the diaphragm being impermeable to a hydraulic liquid for filling the hydraulic chamber and to a delivery liquid for filling the delivery chamber; and a hydraulic actuator that is operable to apply pressure to the hydraulic liquid in the hydraulic liquid conduit so as to force the hydraulic liquid into the hydraulic chamber of a rigid reservoir of the plurality of rigid reservoirs whose valve is open so as to push the flexible diaphragm of that rigid reservoir distally to force the delivery liquid from the delivery chamber of that rigid reservoir into the connected delivery conduit, and that is operable to apply suction to the hydraulic liquid in the hydraulic liquid conduit so as to draw the hydraulic liquid from the hydraulic chamber of that rigid reservoir whose valve is open so as to proximally pull the flexible diaphragm of that rigid chamber to draw the delivery liquid from the connected delivery conduit into the delivery chamber of that rigid reservoir.

Furthermore, in accordance with an embodiment of the present invention, the hydraulic actuator includes a syringe pump.

Furthermore, in accordance with an embodiment of the present invention, a motor of the hydraulic actuator includes a servo motor or a stepper motor.

Furthermore, in accordance with an embodiment of the present invention, the system includes a hydraulic liquid reservoir for storing the hydraulic liquid, the hydraulic liquid reservoir being connected to the hydraulic liquid conduit via a hydraulic liquid reservoir valve.

Furthermore, in accordance with an embodiment of the present invention, a wall of the hydraulic liquid reservoir is expandable and collapsible.

Furthermore, in accordance with an embodiment of the present invention, the wall is elastic.

Furthermore, in accordance with an embodiment of the present invention, the hydraulic liquid reservoir includes an internal structure to prevent total collapse of the wall.

Furthermore, in accordance with an embodiment of the present invention, the delivery conduit is connected via a check valve to a destination component of the system.

Furthermore, in accordance with an embodiment of the present invention, the delivery conduit is connected via a check valve to a source of the delivery liquid.

Furthermore, in accordance with an embodiment of the present invention, the delivery conduit includes a gas removal assembly.

Furthermore, in accordance with an embodiment of the present invention, the gas removal assembly includes a gas removal component that is permeable to a gas to be removed and impermeable to the delivery liquid.

Furthermore, in accordance with an embodiment of the present invention, the valve includes a solenoid that is operable to open or close the valve.

Furthermore, in accordance with an embodiment of the present invention, the diaphragm includes an elastomer.

There is further provided, in accordance with an embodiment of the present invention, a method of delivering a delivery liquid to a destination, the method including: opening a valve that connects a hydraulic liquid conduit of a liquid delivery system to a hydraulic chamber of a selected rigid reservoir of a plurality of rigid reservoirs of the system, a delivery chamber of the selected rigid reservoir containing the delivery liquid, an interior space of each rigid reservoir of the plurality of rigid reservoirs being divided by a flexible diaphragm into the hydraulic chamber and the delivery chamber, the diaphragm being impermeable to a hydraulic liquid and to the delivery liquid; and operating a hydraulic actuator of the system to apply pressure to the hydraulic liquid in the hydraulic liquid conduit to force the hydraulic liquid into the hydraulic chamber of the selected rigid reservoir, distally pushing the diaphragm of the selected rigid reservoir to force the delivery liquid from the delivery chamber of the selected rigid reservoir into a delivery conduit that connects the delivery chamber to the destination.

Furthermore, in accordance with an embodiment of the present invention, operating the hydraulic actuator includes displacing a piston of a syringe pump.

Furthermore, in accordance with an embodiment of the present invention, the method includes, prior to the opening a valve: closing the valves that connect the hydraulic liquid conduit to the hydraulic chambers all of the plurality of rigid reservoirs; and opening a hydraulic reservoir valve that connects a reservoir of the hydraulic liquid to the hydraulic liquid conduit; and operating the hydraulic actuator to draw a quantity of the hydraulic liquid from the reservoir of the hydraulic liquid.

Furthermore, in accordance with an embodiment of the present invention, the quantity is determined in accordance with a sensed volume of the hydraulic liquid that is present in a chamber of the hydraulic actuator.

There is further provided, in accordance with an embodiment of the present invention, a method of delivering a delivery liquid from a source to a selected rigid reservoir of a plurality of rigid reservoirs of a liquid delivery system, the method including: opening a valve that connects a hydraulic liquid conduit of the system to a hydraulic chamber of the selected rigid reservoir, a delivery chamber of the selected rigid reservoir to be filled with the delivery liquid, an interior space of each rigid reservoir of the plurality of rigid reservoirs being divided by a flexible diaphragm into the hydraulic chamber and the delivery chamber, the diaphragm being impermeable to a hydraulic liquid and to the delivery liquid, the hydraulic chamber being initially at least partially filled with the hydraulic liquid; and operating a hydraulic actuator of the system to apply suction to the hydraulic liquid in the hydraulic liquid conduit so as to draw the hydraulic liquid out of the hydraulic chamber of the selected rigid reservoir to proximally retract the flexible diaphragm of the selected rigid reservoir to draw the delivery liquid from the source into the delivery chamber of the selected rigid reservoir via a delivery conduit that connects the source to the delivery chamber.

Furthermore, in accordance with an embodiment of the present invention, opening the valve includes operating a solenoid of the valve.

Furthermore, in accordance with an embodiment of the present invention, the method includes, prior to opening a valve: closing the valves that connect the hydraulic liquid conduit to the hydraulic chambers all of the plurality of rigid reservoirs; opening a hydraulic reservoir valve that connects a reservoir of the hydraulic liquid to the hydraulic liquid conduit; and operating the hydraulic actuator to force a quantity of the hydraulic liquid into the reservoir of the hydraulic liquid.

BRIEF DESCRIPTION OF THE DRAWINGS

In order for the present invention, to be better understood and for its practical applications to be appreciated, the following Figures are provided and referenced hereafter. It should be noted that the Figures are given as examples only and in no way limit the scope of the invention. Like components are denoted by like reference numerals.

DETAILED DESCRIPTION OF THE INVENTION

Figure 1A:
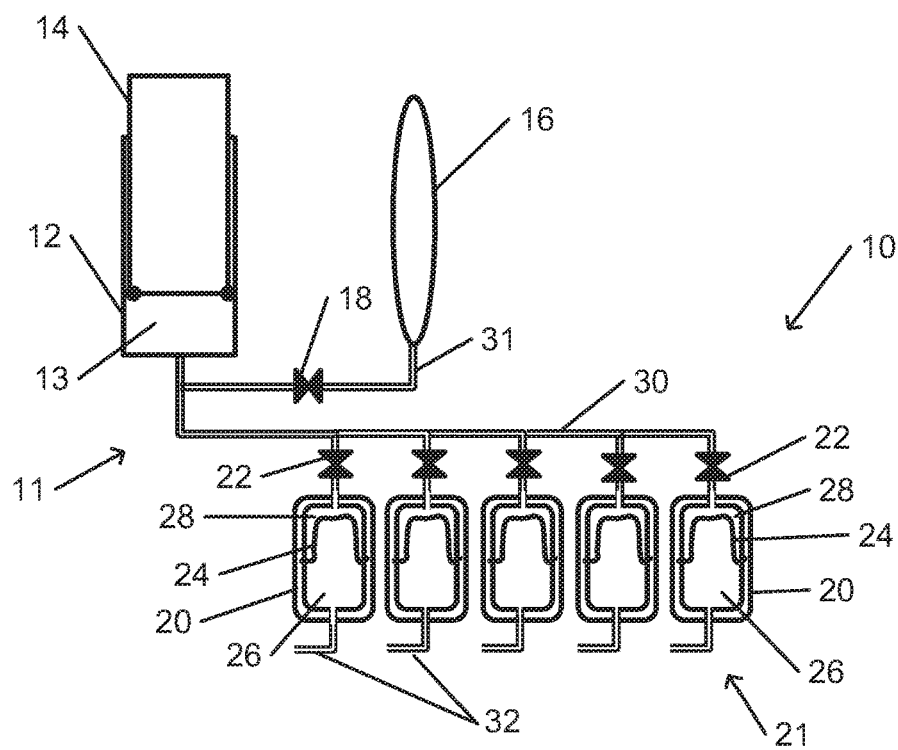
FIG. 1A schematically illustrates a liquid delivery system, in accordance with an embodiment of the present invention.

In the following detailed description, numerous specific details are set forth in order to provide a thorough understanding of the invention. However, it will be understood by those of ordinary skill in the art that the invention may be practiced without these specific details. In other instances, well-known methods, procedures, components, modules, units and/or circuits have not been described in detail so as not to obscure the invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium (e.g., a memory) that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently. Unless otherwise indicated, the conjunction "or" as used herein is to be understood as inclusive (any or all of the stated options).

Some embodiments of the invention may include an article such as a computer or processor readable medium, or a computer or processor non-transitory storage medium, such as for example a memory, a disk drive, or a USB flash memory, encoding, including or storing instructions, e.g., computer-executable instructions, which when executed by a processor or controller, carry out methods disclosed herein.

In accordance with an embodiment of the present invention, a multichannel liquid delivery system is configured to enable controlled flow of one or more liquids in a microgravity environment. For example, one or more of the liquids may be caused to flow in or out of one or more of a plurality of rigid reservoirs. These liquids whose flows are controlled are, for convenience, referred to herein as delivery liquids. Delivery liquids may be delivered to or from the rigid reservoirs. For example, a delivery liquid may include a reagent for participation in a chemical or biological reaction, a product of a reaction, a flushing or cleansing liquid, or another type of liquid. A reservoir is considered to be rigid when the outer walls of the reservoir do not appreciably bend or distort under a pressure of a magnitude that is applied during typical operation of the liquid delivery system. Thus, the total volume of the rigid reservoir remains substantially constant throughout operation of the liquid delivery system.

Flow of delivery liquids in or out of the containers (e.g., to or from a reactor, lab-on-a-chip, a disposal container, a liquid source container, or to or from another processing unit or destination) may be controlled or actuated by a hydraulic system. The hydraulic system includes a hydraulic actuator that is configured to apply a pressure or suction to liquid of the hydraulic system, referred to herein as the hydraulic liquid. For example, the hydraulic actuator may include a syringe pump, or another type of hydraulic actuator that is suitable for operation in a microgravity environment (and possibly in the absence of ambient atmospheric or gas pressure). The hydraulic system includes a plurality of controllable valves. Each of the valves may be closed to hydraulically isolate one section of the hydraulic system from the remainder of the hydraulic system. For example, closing the valve may prevent the flow of hydraulic liquid into or out of that section, and may prevent the transmission of hydraulic pressure to hydraulic liquid in that section. The hydraulic liquid is maintained separate from the delivery liquid so as to prevent direct contact with the hydraulic liquid or mixing of the hydraulic liquid with any of the delivery liquids.

The hydraulic system may be closed, with no openings to the ambient environment. Both the hydraulic liquid and the delivery liquids are assumed to be substantially incompressible. Therefore, a pressure or suction that is applied to a liquid at one point of the hydraulic system may be transmitted throughout the hydraulic system, except to sections of the hydraulic system that are isolated from the remainder of the hydraulic system by one or more closed valves.

Each of the rigid reservoirs may be provided with a flexible diaphragm that is impermeable to both any delivery liquid that may be introduced into the rigid reservoir, and to the hydraulic liquid. The flexible diaphragm prevents direct contact between the delivery liquid and the hydraulic liquid that are in the same rigid reservoir. The flexible may thus be considered to divide the fixed interior volume of the rigid reservoir into two chambers of variable size. The flexible diaphragm may configured such that, when the flexible diaphragm is fully pushed in either direction, the flexible diaphragm lies close to the rigid walls of the rigid reservoir. Thus, for example, when the flexible diaphragm is pushed fully in one direction, the volume of one of the chambers is equal to, or is almost equal to, the entire volume of the rigid reservoir. In this case, the volume of the other chamber is close to zero. When the flexible diaphragm is fully pushed in the opposite direction, the volumes of the two chambers are interchanged.

For example, the flexible diaphragm may be sufficiently elastic so as to stretch toward the walls of the rigid reservoir. For example, the flexible diaphragm may be constructed of a chemically stable elastomer (e.g., that does not react with, or that is not chemically corroded by, contact with the hydraulic liquid or with any components of the delivery liquids, at least under anticipated conditions). In some cases, the flexible diaphragm may not be elastic such that its surface area is substantially constant. In such cases, the flexible diaphragm may be configured to fold or crumple to accommodate intermediate positions of the diaphragm, e.g., when the two chambers have approximately equal volumes.

A proximal conduit to enable flow of the hydraulic liquid into or out of the rigid reservoir may be provided with a valve. Operation of the valve may be controlled by a controller. When the valve is open, pressure that is exerted by the hydraulic actuator, e.g., by extension of a piston of a syringe pump, may force the hydraulic liquid via the valve into the rigid reservoir. The pressure of the hydraulic liquid may be applied to delivery liquid in the rigid reservoir via the flexible diaphragm. The applied pressure may thus force delivery liquid out of the rigid reservoir and into a distal conduit. Similarly, suction that is applied to the hydraulic liquid by the hydraulic actuator, e.g., by retraction of the piston of a syringe pump, may withdraw hydraulic liquid from the rigid reservoir via the open valve. Withdrawal of the hydraulic liquid from the rigid reservoir may apply a suction force to the flexible diaphragm, pulling the flexible diaphragm toward the proximal conduit. The pulling of the flexible diaphragm may draw delivery liquid into the rigid reservoir via the distal conduit.

When more than one valve is open, hydraulic liquid may be concurrently forced into or withdrawn from more than one rigid reservoir. In this manner, a single hydraulic actuator may be operated to cause a plurality of delivery liquids to flow concurrently out of a plurality of different rigid reservoirs, e.g., into a reactor vessel or chip, or other component where the delivery liquids may interact.

The volume of active hydraulic liquid in the conduits and rigid reservoirs of the hydraulic system may vary over time as a configuration of the liquid delivery system changes. For example, the volume of active hydraulic liquid to enable operation of the hydraulic system may depend on such factors as the number of valves to rigid reservoirs that are currently open, and on the current position of the flexible diaphragm in each of the rigid reservoirs.

The hydraulic system may include a reservoir of hydraulic liquid for storing hydraulic liquid. The volume of active hydraulic liquid in the hydraulic system may be increased by drawing hydraulic liquid from the hydraulic liquid reservoir. Similarly, volume of active hydraulic liquid in the hydraulic system may be decreased by forcing hydraulic liquid into the hydraulic liquid reservoir. For example, the hydraulic liquid reservoir may include a container with one or more elastic walls, or walls whose surface area is otherwise expandable and collapsible (e.g., capable of being crumpled and uncrumpled, having accordion folds, or otherwise expandable and collapsible). Hydraulic liquid may be forced into the hydraulic liquid reservoir by action of the hydraulic actuator (e.g., when the valves to the rigid reservoirs are closed). Hydraulic liquid that is forced into the hydraulic liquid reservoir to be stored may expand the expandable walls. After the hydraulic liquid is stored in the hydraulic liquid reservoir, a valve that connects the hydraulic liquid reservoir to the remainder of the hydraulic system may be closed. When hydraulic liquid is to be drawn from the hydraulic liquid reservoir, the valve to the hydraulic liquid reservoir may be opened. Suction that is applied by the hydraulic actuator, together with collapse of the collapsible walls of the hydraulic liquid reservoir, may enable hydraulic liquid to be drawn out of the hydraulic liquid reservoir and into the remainder of the hydraulic system (e.g., into an internal cavity of the hydraulic actuator, e.g., in the form of a syringe pump).

In some cases, the hydraulic liquid reservoir may include internal structure to prevent collapse of the expandable and collapsible walls so as to enable the hydraulic liquid to flow into and out of all parts of the hydraulic liquid reservoir. The liquid delivery system may include a mechanism for filling or draining delivery liquid into or from the rigid reservoirs, and may include a mechanism for removing gas bubbles from the liquid delivery system.

A liquid delivery system, in accordance with an embodiment of the present invention, may be advantageous over other types of liquid delivery systems. For example, a liquid delivery system in accordance with an embodiment of the present invention, which uses a liquid as its hydraulic fluid instead of a gas, and which includes diaphragms to separate hydraulic liquid from delivery liquids, lends itself to miniaturization and remote reuse. The liquid delivery system may operate equally well in any orientation or in the absence of appreciable gravity and air pressure. Thus, the liquid delivery system may be used in remotely controlled vehicles whose orientation may not be controllable or where the absence of gravity makes orientation irrelevant (e.g., for operation underwater, underground, on planetary surfaces, in earth orbit or interplanetary space, or otherwise). The liquid delivery system enables transfer of delivery liquids either concurrently from or to a plurality or rigid reservoirs, or selective transfer from or to a subset of one or more of the reservoirs using a single hydraulic actuator.

Figure 1B:
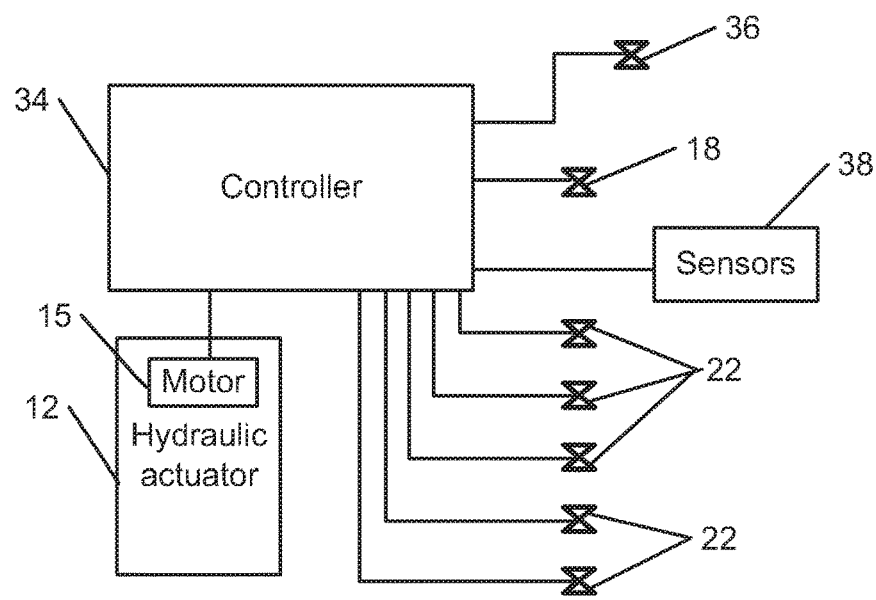
FIG. 1B is a schematic block diagram of control of components of the liquid delivery system shown in FIG. 1A.

FIG. 1A schematically illustrates a liquid delivery system, in accordance with an embodiment of the present invention. FIG. 1B is a schematic block diagram of control of components of the liquid delivery system shown in FIG. 1A.

Liquid delivery system 10 may be operated to selectively and concurrently deliver one or more delivery liquids to or from one or more of a plurality of rigid reservoirs 20. For example, the delivery liquids may be delivered to a reactor or other unit (not shown) via one or more delivery conduits 32 where different delivery liquids interact via one or more chemical, physical, or biological processes. A product of a process may be delivered from the reactor or unit to one or more of rigid reservoirs 20. Similarly, a delivery liquid, such as a detergent or solvent, for flushing, cleaning, or rinsing a rigid reservoir 20 or delivery conduit 32 may be delivered to or from one or more rigid reservoirs 20.

Liquid delivery system 10 includes hydraulic system 11 which may be operated to cause concurrent outflow or inflow of a delivery liquid, such as a reagent liquid or another liquid, out of or into one or more rigid reservoirs 20 via reagent delivery system 21. Operation of components of hydraulic system 11 and of reagent delivery system 21 may be controlled by controller 34. For example, controller 34 may be operated locally or remotely by a human operator. Alternatively or in addition, controller 34 may include, or may communicate with, one or more processing units that are configured to operate controller 34 in accordance with programmed instructions. Controller 34 may include two or more physically separated units, e.g., each configured to perform one or more operations of operation of controller 34.

Hydraulic system 11 includes hydraulic actuator 12. For example, hydraulic actuator 12 may be operated by a motor 15. Motor 15 may include an electrically operated motor (e.g., a servo motor, stepper motor, or other type of electric motor or actuator that enables controllable operation of hydraulic actuator 12). Hydraulic actuator 12 may be operated by controller 34 to apply pressure or suction ("negative pressure") to hydraulic liquid that is in hydraulic system 11. Hydraulic actuator 12 may have a cylindrical cross section, or another cross section (e.g., oval or elliptic, rectangular or polygonal, or another shape).

In some cases, hydraulic actuator 12 may include a syringe pump with a piston 14. For example, piston 14 may be configured to be displaced by motor 15. Piston 14 may be operated to move in a distal direction (e.g., toward hydraulic liquid conduit 30) to apply pressure to hydraulic liquid in actuator chamber 13, and to hydraulic system 11. Similarly, piston 14 may be operated to move in a proximal direction (e.g., away from hydraulic liquid conduit 30) to draw hydraulic liquid from hydraulic system 11 into actuator chamber 13, and thus apply suction to hydraulic system 11. Hydraulic actuator 12 may include one or more other types of pumps or actuators that are suitable for causing flow of hydraulic liquid in hydraulic system 11, e.g., in a microgravity environment, in a vacuum, or under other environmental conditions of liquid delivery system 10.

Liquid delivery system 10 includes reagent delivery system 21. Reagent delivery system 21 is configured to concurrently deliver a plurality of delivery liquids into or out of one or more rigid reservoirs 20.

Each rigid reservoir 20 may be surrounded by a substantially rigid wall or walls. An interior space of each rigid reservoir 20 is divided by a flexible diaphragm 24 into two internal chambers. Hydraulic chamber 28 is a proximal chamber located on the proximal side of flexible diaphragm 24 and is connectible to hydraulic system 11 by opening rigid reservoir valve 22, a separate rigid reservoir valve 22 being provided for each hydraulic chamber 28. Delivery chamber 26 is a distal chamber located on the distal side of flexible diaphragm 24, and each delivery chamber 26 is connected to, and is open to, a separate delivery conduit 32.

Flexible diaphragm 24 is impermeable to both the delivery liquid and to the hydraulic liquid. Thus, flexible diaphragm 24 prevents any type of mixing or contact between the delivery liquid and the hydraulic liquid. For example, flexible diaphragm 24 may be constructed of, or may include, a chemically stable elastomer such as a fluoroelastomer (e.g., Viton®). Flexible diaphragm 24 may bend, stretch, or both to change the partition of the volume of rigid reservoir 20 into hydraulic chamber 28 and delivery chamber 26. For example, operation of hydraulic actuator 12 to apply pressure to hydraulic liquid in hydraulic chamber 28 may bend flexible diaphragm 24 distally toward delivery conduit 32. The distal bending of flexible diaphragm 24 increases the volume of hydraulic chamber 28 while reducing the volume of delivery chamber 26. Thus, delivery liquid in delivery chamber 26 is forced out of delivery chamber 26 and into the delivery conduit 32 that is connected to that delivery chamber 26. Similarly, operation of hydraulic actuator 12 to apply suction to hydraulic liquid in hydraulic chamber 28 may bend flexible diaphragm 24 proximally toward hydraulic conduit 30. The proximal bending of flexible diaphragm 24 increases the volume of delivery chamber 26 while reducing the volume of hydraulic chamber 28. Thus, delivery liquid in a delivery conduit 32 (or in a container or component that is connected to that delivery conduit 32) may be drawn into delivery chamber 26 of the rigid reservoir 20 that is connected to that delivery conduit 32.

Controller 34 may be operated to selectively deliver delivery liquid to or from a delivery chamber 26 of one or more selected rigid reservoirs 20. For example, controller 34 may selectively open or close one or more rigid reservoir valves 22. When a rigid reservoir valve 22 that is connected to a hydraulic chamber 28 of a particular rigid reservoir 20 is opened, delivery liquid may be caused to flow into or out of the delivery chamber 26 of that rigid reservoir 20 by operation hydraulic actuator 12. On the each, when the rigid reservoir valve 22 that is connected to a hydraulic chamber 28 of a particular rigid reservoir 20 is closed, operation of hydraulic actuator 12 does not cause delivery liquid to flow into or out of the delivery chamber 26 of that rigid reservoir 20.

Excess hydraulic liquid may be stored in hydraulic liquid reservoir 16. For example, hydraulic liquid reservoir 16 may have expandable and collapsible (e.g., elastic) walls or may be otherwise configured to facilitate draining of hydraulic liquid in a microgravity environment. The expandable walls of hydraulic actuator 12 may expand when hydraulic liquid is forced into hydraulic liquid reservoir 16 via hydraulic reservoir conduit 31 by operation of hydraulic actuator 12 when hydraulic reservoir valve 18 is open. Thus, the surface tension of the walls of hydraulic liquid reservoir 16 may be increased. Similarly, when hydraulic liquid is enabled to drain from hydraulic liquid reservoir 16, the collapsible walls of hydraulic liquid reservoir 16 may collapse, thus enabling withdrawal of hydraulic liquid from hydraulic liquid reservoir 16 via hydraulic reservoir conduit 31 into actuator chamber 13 or elsewhere in hydraulic system 11. Hydraulic reservoir valve 18 may be closed to prevent flow of hydraulic liquid into or out of hydraulic liquid reservoir 16.

Controller 34 may be configured to operate one or more components of liquid delivery system 10 in accordance with signals received from one or more sensors 38. For example, one or more sensors 38 may sense a status of one or more components of liquid delivery system 10. Sensors 38 may include, for example, a flowmeter for measuring a liquid flow in a conduit, a pressure sensor for measuring hydraulic pressure in a component of liquid delivery system 10, a position or volume sensor for measuring a position of a component (e.g., piston 14, flexible diaphragm 24, or another moving component of liquid delivery system 10), a sensor for sensing a current state of a valve (e.g., open or closed), a sensor for sensing a volume of liquid in a component, or another type of sensor.

One or more of rigid reservoir valves 22, hydraulic reservoir valve 18, and additional valves 36 or other components may be operable by operation of controller 34. For example, one or more of rigid reservoir valves 22, hydraulic reservoir valve 18, and additional valves 36 may include a solenoid, the electric current through which may be controlled by controller 34. As another example, one or more of rigid reservoir valves 22, hydraulic reservoir valve 18, and additional valves 36 may be motorized or otherwise operable by controller 34. For example, in some cases, additional valves 36 may include one or more valves on each delivery conduit 32 (e.g., connected to a liquid processing site, to a delivery liquid source container, to a disposal container, or elsewhere), or elsewhere in liquid delivery system 10. Thus, controller 34 may operate to selectively open and close various combinations of rigid reservoir valves 22. Therefore, subsequent operation of hydraulic actuator 12 may cause one or more delivery liquids to flow concurrently out of or into one or more delivery chambers 26 of rigid reservoirs 20.

Figure 2:
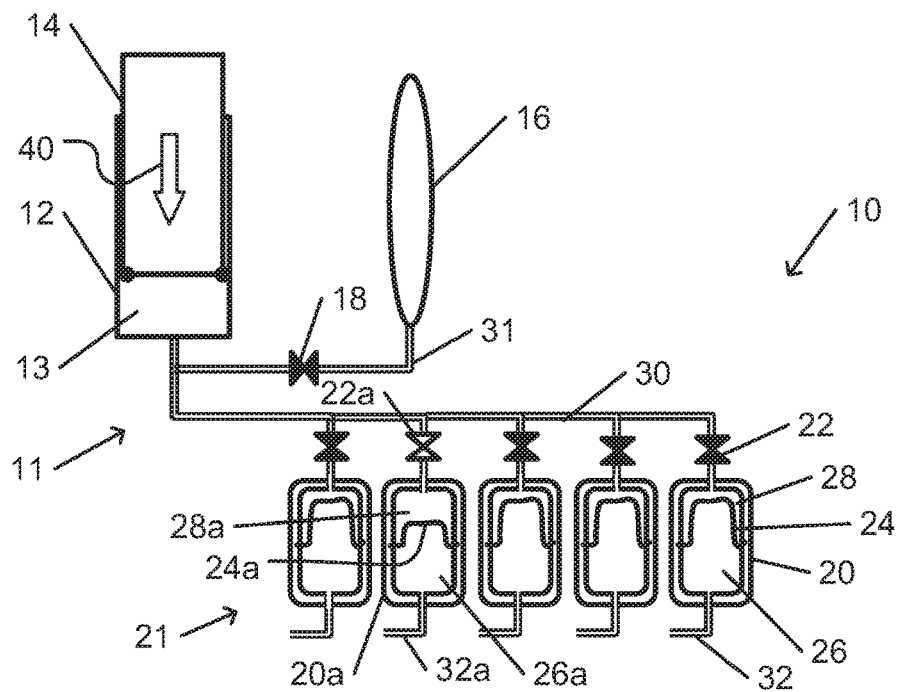
FIG. 2 schematically illustrates operation of the liquid delivery system shown in FIG. 1A to deliver a delivery liquid from a rigid reservoir, in accordance with an embodiment of the present invention.

FIG. 2 schematically illustrates operation of the liquid delivery system shown in FIG. 1A to deliver a delivery liquid from a rigid reservoir, in accordance with an embodiment of the present invention.

In the configuration shown in FIG. 2, a delivery liquid is being transferred from delivery chamber 26a of selected rigid reservoir 20a to delivery conduit 32a. For example, a distal end of delivery conduit 32a may connect to a destination for the delivery liquid in delivery chamber 26a. The destination may include a reactor or other liquid processing unit, a disposal container or drain, or another type of destination. The contents of all other rigid reservoirs 20 remain substantially unchanged.

In the configuration shown, selected rigid reservoir valve 22a is open, connecting hydraulic chamber 28a of selected rigid reservoir 20a to hydraulic conduit 30, and hydraulic actuator 12 and the remainder of hydraulic system 11. All other rigid reservoir valves 22 remain closed, as does hydraulic reservoir valve 18. Thus, all other hydraulic chambers 28, as well as hydraulic liquid reservoir 16, are isolated from hydraulic actuator 12. (In some cases, opening of reservoir valves 22 may be limited to one open rigid reservoir valve 22 at a time, e.g., to enable precise control of the volume of each delivery liquid that is delivered out of, or into, each delivery chamber 26.)

Hydraulic actuator 12 may be operated to apply pressure to hydraulic liquid in hydraulic conduit 30. For example, piston 14 of a hydraulic actuator 12 in the form of a syringe pump or similar pump or actuator may be moved in distal direction 40 to apply pressure to hydraulic liquid in actuator chamber 13. In this manner, hydraulic liquid is forced out of actuator chamber 13 and into hydraulic chamber 28a via hydraulic conduit 30 and open selected rigid reservoir valve 22a. As hydraulic liquid is forced into hydraulic chamber 28a, hydraulic chamber 28a expands by pushing flexible diaphragm 24a distally toward delivery chamber 26a. Thus, delivery liquid is forced out delivery chamber 26a and into delivery conduit 32a.

Figure 3:
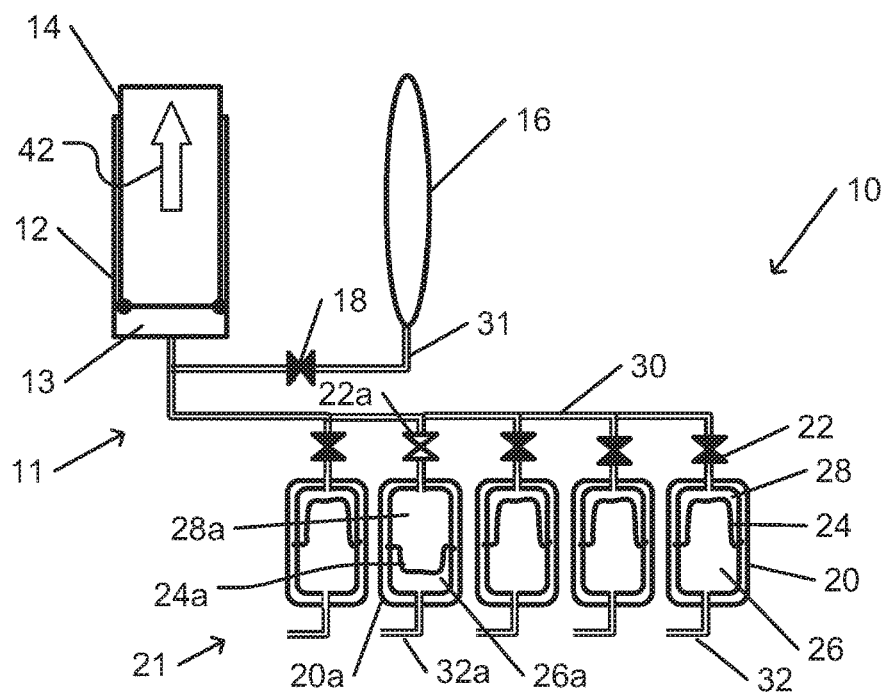
FIG. 3 schematically illustrates operation of the liquid delivery system shown in FIG. 1A to draw a delivery liquid into a rigid reservoir, in accordance with an embodiment of the present invention.

FIG. 3 schematically illustrates operation of the liquid delivery system shown in FIG. 1A to draw a delivery liquid into a rigid reservoir, in accordance with an embodiment of the present invention.

In the configuration shown in FIG. 3, a delivery liquid is being drawn into delivery chamber 26a of selected rigid reservoir 20a, only, from delivery conduit 32a. For example, a distal end of delivery conduit 32a may connect to a source of delivery liquid to be drawn into in delivery chamber 26a. The source may include a reactor or other liquid processing unit where a liquid reaction product is produced, a source container, or another type of source. The contents of all other rigid reservoirs 20 remain substantially unchanged.

In the configuration shown, selected rigid reservoir valve 22a is open, connecting hydraulic chamber 28a of selected rigid reservoir 20a to hydraulic conduit 30, and to hydraulic actuator 12 and the remainder of hydraulic system 11. All other rigid reservoir valves 22 remain closed, as does hydraulic reservoir valve 18. Thus, all other hydraulic chambers 28, as well as hydraulic liquid reservoir 16, are isolated from hydraulic actuator 12.

Hydraulic actuator 12 may be operated to apply suction to hydraulic liquid in hydraulic conduit 30. For example, piston 14 of a hydraulic actuator 12 in the form of a syringe pump or similar pump or actuator may be moved in proximal direction 42 to expand actuator chamber 13. In this manner, hydraulic liquid is drawn into actuator chamber 13 from hydraulic chamber 28a via hydraulic conduit 30 and open selected rigid reservoir valve 22a. As hydraulic liquid is drawn from hydraulic chamber 28a, the volume of hydraulic chamber 28a contracts, pulling flexible diaphragm 24a proximally out of delivery chamber 26a (assuming that the hydraulic liquid is incompressible and that hydraulic system 11 is sealed such that there are no openings between hydraulic system 11 and the exterior environment). Thus, delivery liquid is drawn into delivery chamber 26a from delivery conduit 32a (assuming that the delivery liquid is incompressible and that reagent delivery system 21 is sealed from the exterior environment).

A volume of hydraulic liquid in components of hydraulic system 11 that enables operation of hydraulic system 11 (active hydraulic liquid) may vary in accordance with a current configuration and intended operation of liquid delivery system 10. For example, when delivery chambers 26 of all rigid reservoirs 20 are filled with delivery liquid (e.g., as in FIG. 1A) and delivery liquid is to be delivered from only one (e.g., delivery chamber 26a as in FIG. 2), a minimal amount of active hydraulic liquid may be required (for example, where the maximum capacity of actuator chamber 13 is less than the maximum volume of active hydraulic liquid required for operation of liquid delivery system 10 under all expected circumstances, e.g., delivery of the entire contents of all delivery chambers 26).

On the other hand, in some cases, delivery liquid in delivery chambers 26 of some of rigid reservoirs 20 may be empty or only partially filled (e.g., after previous delivery of delivery liquid from those delivery chambers 26, or prior to filling those delivery chambers 26). In this case, hydraulic chambers 28 of those rigid reservoirs 20 may be completely or partially filled with hydraulic liquid. In this case, the volume of active hydraulic liquid (e.g., the volume of hydraulic liquid that remains in actuator chamber 13) may not be adequate for delivery of delivery liquid from the remaining filled or partially filled delivery chambers 26. In this case, the volume of active hydraulic liquid may be increased by drawing hydraulic liquid from hydraulic liquid reservoir 16 (e.g., into actuator chamber 13).

Figure 4:
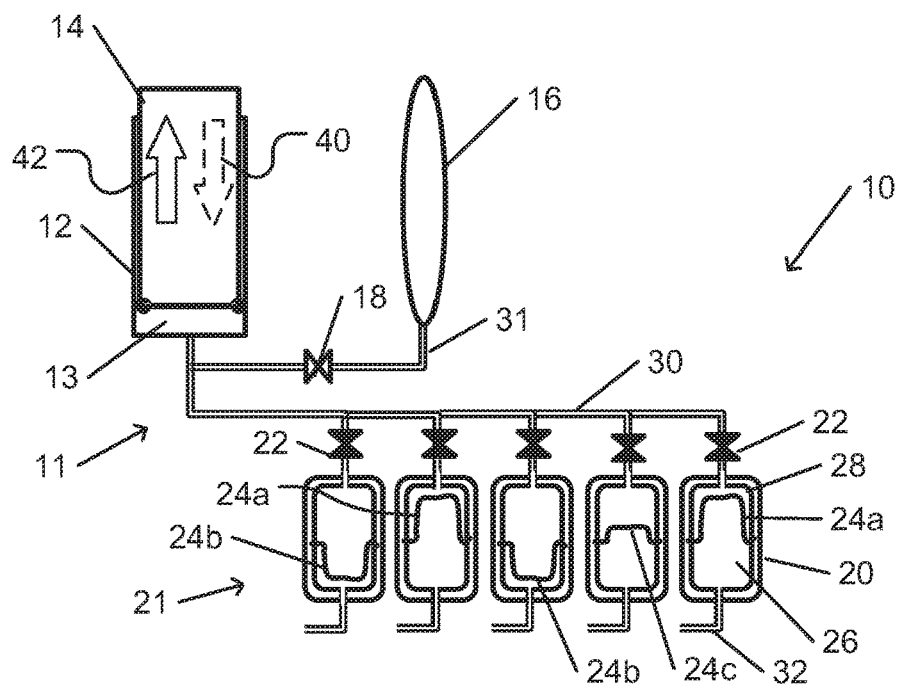
FIG. 4 schematically illustrates operation of the liquid delivery system shown in FIG. 1A to draw a hydraulic liquid for a hydraulic liquid reservoir, in accordance with an embodiment of the present invention.

FIG. 4 schematically illustrates operation of the liquid delivery system shown in FIG. 1A to draw a hydraulic liquid for a hydraulic liquid reservoir, in accordance with an embodiment of the present invention.

In the example configuration shown in FIG. 4, flexible diaphragms 24b are fully distally extended such that the corresponding hydraulic chambers 28 are approximately maximally filled with hydraulic liquid. Flexible diaphragm 24c is approximately at the midpoint of its range of extension such that volume of its corresponding hydraulic chamber 28 is at approximately half of the maximum volume. Flexible diaphragms 24a are maximally proximally retracted. In this configuration, the amount of hydraulic liquid that remains in actuator chamber 13 may be insufficient to deliver all of the delivery liquid in the delivery chambers 26 that correspond to proximally retracted flexible diaphragms 24.

In the example configuration shown, hydraulic system 11 may be operated to draw hydraulic liquid from hydraulic liquid reservoir 16 into actuator chamber 13. All of rigid reservoir valves 22 are closed and hydraulic reservoir valve 18 is opened. Piston 14 of hydraulic actuator 12 is moved in proximal direction 42 to expand actuator chamber 13. Hydraulic liquid is drawn into actuator chamber 13 from hydraulic liquid reservoir 16 via hydraulic reservoir conduit 31 and open hydraulic reservoir valve 18. While drawing hydraulic liquid from hydraulic liquid reservoir 16, walls of hydraulic liquid reservoir 16 may collapse. When a sufficient volume of hydraulic liquid has been drawn from hydraulic liquid reservoir 16 into actuator chamber 13 (e.g., as determined by programmed instructions for operation of controller 34, e.g., in accordance with quantities that are sensed by sensors 38), proximal motion 42 of piston 14 may be stopped.

After drawing hydraulic liquid from hydraulic liquid reservoir 16 into actuator chamber 13, hydraulic reservoir valve 18 may be closed. Subsequent motion of piston 14 in distal direction 40 may force hydraulic liquid into any hydraulic chambers 28 whose corresponding rigid reservoir valves 22 are open.

In some cases, e.g., when the current volume of actuator chamber 13 is close to its maximum volume, piston 14 may not be able to be displaced by a sufficient distance in proximal direction 42 to draw sufficient hydraulic liquid from hydraulic chambers 28, e.g., to draw delivery liquid into one or more delivery chambers 26. In such a case, the actions described above may be reversed in order to expel hydraulic liquid from actuator chamber 13 into hydraulic liquid reservoir 16.

In order for hydraulic liquid to be forced from actuator chamber 13 into hydraulic liquid reservoir 16, all of rigid reservoir valves 22 may be closed and hydraulic reservoir valve 18 may be opened. Piston 14 of hydraulic actuator 12 may be moved in distal direction 40 to reduce the volume of actuator chamber 13. Hydraulic liquid is expelled from actuator chamber 13 into hydraulic liquid reservoir 16 via hydraulic reservoir conduit 31 and open hydraulic reservoir valve 18. While forcing hydraulic liquid into hydraulic liquid reservoir 16, walls of hydraulic liquid reservoir 16 may expand. When a sufficient volume of hydraulic liquid has been expelled into hydraulic liquid reservoir 16 from actuator chamber 13 (e.g., as determined by programmed instructions for operation of controller 34, e.g., in accordance with quantities that are sensed by sensors 38), distal motion 40 of piston 14 may be stopped.

After hydraulic liquid has been forced into hydraulic liquid reservoir 16 from actuator chamber 13, hydraulic reservoir valve 18 may be closed. Subsequent motion of piston 14 in proximal direction 42 may draw hydraulic liquid from any hydraulic chambers 28 whose corresponding rigid reservoir valves 22 are open.

In accordance with an embodiment of the present invention, after hydraulic liquid is drawn from hydraulic liquid reservoir 16 into actuator chamber 13, hydraulic reservoir valve 18 may be closed. Subsequent motion of piston 14 in distal direction 40 may force hydraulic liquid into any hydraulic chambers 28 whose corresponding rigid reservoir valves 22 are open.

After hydraulic liquid is drawn from hydraulic liquid reservoir 16 into actuator chamber 13, hydraulic reservoir valve 18 may be closed. Subsequent motion of piston 14 in distal direction 40 may force hydraulic liquid into any hydraulic chambers 28 whose corresponding rigid reservoir valves 22 are open.

In some cases, liquid delivery system 10 may include features to facilitate automated operation and to facilitate operation in a microgravity environment.

Figure 5:
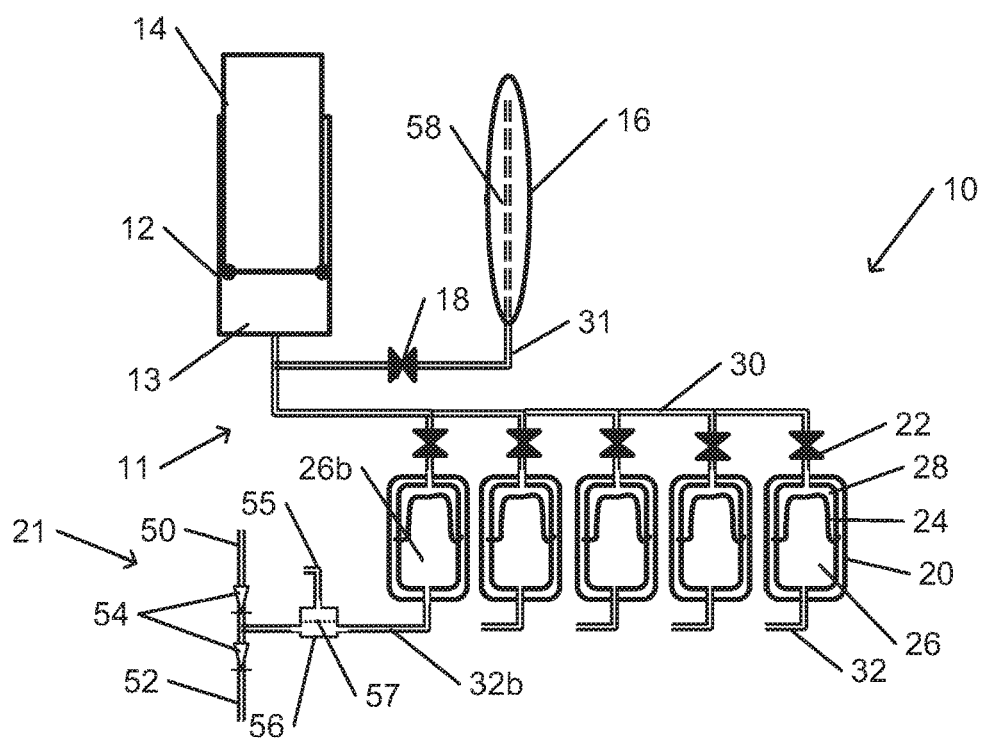
FIG. 5 schematically illustrates components of the liquid delivery system shown in FIG. 1A for facilitating automated operation and operation in a microgravity environment.

FIG. 5 schematically illustrates components of the liquid delivery system shown in FIG. 1A for facilitating automated operation and operation in a microgravity environment.

Hydraulic liquid reservoir 16 may include internal reservoir structure 58 to prevent total collapse of the walls of hydraulic liquid reservoir 16. For example, internal reservoir structure 58 may include a rigid internal tube with perforations or lateral projections, or walls with internal ribs, to prevent total collapse of the walls of hydraulic liquid reservoir 16. Internal reservoir structure 58 may ensure or facilitate introduction of hydraulic into, and withdrawal of hydraulic liquid from, all parts of hydraulic liquid reservoir 16.

One or more, or all, of delivery conduits 32, such as delivery conduit 32b as shown, may each be connected to a delivery liquid source conduit 50 (e.g., connected to a delivery liquid source container, not shown), and to a delivery conduit 52 (e.g., connected to a destination component, not shown, of liquid delivery system 10 to which delivery liquid from delivery chamber 26b is to be delivered). A system of unidirectional valves, such as single state check valves 54, or other types of unidirectional valves or valve assemblies, may be provided to prevent delivery of delivery liquid from delivery chamber 26b to delivery liquid source conduit 50, or filling of delivery chamber 26b from delivery conduit 52.

Delivery conduit 32b may be provided with a gas removal assembly 56 for removing trapped gas or gas bubbles from delivery conduit 32b. For example, gas removal assembly 56 may include a gas separation component 57 (e.g., a membrane or other component that is permeable to a gas to be removed but impermeable to the delivery liquid) that may separate gas from delivery liquid in delivery conduit 32b. The separated gas may be vented (e.g., to the environment) via gas vent 55.

Controller 34 may be configured to operate liquid delivery system 10 in accordance with a method for control of liquid delivery.

Figure 6:
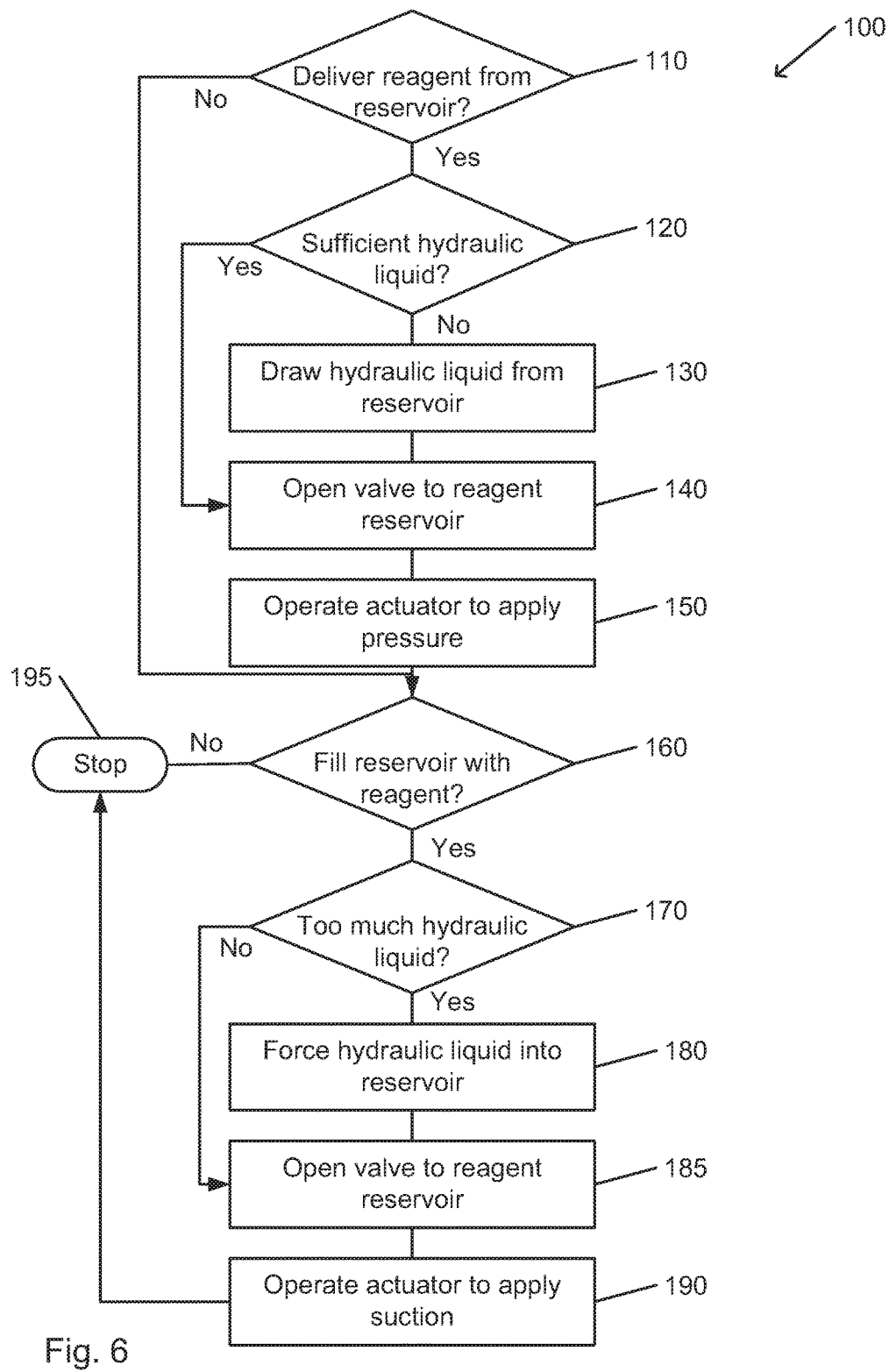
FIG. 6 is a flowchart depicting a method of a controlling liquid delivery system, in accordance with an embodiment of the present invention.

FIG. 6 is a flowchart depicting a method of a controlling liquid delivery system, in accordance with an embodiment of the present invention.

It should be understood with respect to any flowchart referenced herein that the division of the illustrated method into discrete operations represented by blocks of the flowchart has been selected for convenience and clarity only. Alternative division of the illustrated method into discrete operations is possible with equivalent results. Such alternative division of the illustrated method into discrete operations should be understood as representing other embodiments of the illustrated method.

Similarly, it should be understood that, unless indicated otherwise, the illustrated order of execution of the operations represented by blocks of any flowchart referenced herein has been selected for convenience and clarity only. Operations of the illustrated method may be executed in an alternative order, or concurrently, with equivalent results. Such reordering of operations of the illustrated method should be understood as representing other embodiments of the illustrated method.

System control method 100 may be executed by a processor of a c controller 34 of liquid delivery system 10. For example, system control method 100 may be executed when liquid delivery system 10 is commanded (e.g., by a human operator or by programmed instructions for operation of a processor of controller 34) to transfer a delivery liquid.

In some cases, a delivery liquid is to be delivered from one or more selected rigid reservoirs 20 (block 110). For example, the delivery liquid may be delivered to a processing unit of liquid delivery system 10.

A volume of hydraulic liquid in actuator chamber 13 may be checked (e.g., by a sensor 38) and compared with a required volume (block 120). For example, sensor 38 may directly measure a volume of hydraulic liquid in actuator chamber 13, may measure a position of piston 14, or may measure another quantity from which a volume of hydraulic liquid in actuator chamber 13 may be determined.

If the volume is not sufficient, a quantity of hydraulic liquid may be drawn from hydraulic liquid reservoir 16 into actuator chamber 13 (block 130). For example, all rigid reservoir valves 22 may be closed, hydraulic reservoir valve 18 may be opened, and piston 14 may be moved in proximal direction 42. The quantity may be sufficient to increase the volume of hydraulic liquid in actuator chamber 13 to a required or desired volume.

If or when the volume of hydraulic liquid in actuator chamber 13 is sufficient, rigid reservoir valves 22 of selected rigid reservoirs 20 from which hydraulic liquid is to be delivered may be opened (block 140).

Hydraulic actuator 12 may then be operated (e.g., piston 14 may be moved in distal direction 40), so as to force delivery liquid from the selected rigid reservoirs 20 (block 150).

In some cases, a delivery liquid is to be delivered to one or more selected rigid reservoirs 20 so as to fill a delivery chamber 26 of each selected rigid reservoir 20 with a delivery liquid from a source to which that delivery chamber 26 is connected (block 160). For example, the delivery liquid may be delivered from a container of the delivery liquid. If not, execution of system control method 100 may be terminated (block 195).

A volume of hydraulic liquid in actuator chamber 13 may be checked (e.g., by a sensor 38) and compared with a required volume (block 170). For example, sensor 38 may directly measure a volume of hydraulic liquid in actuator chamber 13, may measure a position of piston 14, or may measure another quantity from which a volume of hydraulic liquid in actuator chamber 13 may be determined.

If the volume is too large to enable drawing of delivery liquid into the selected rigid reservoirs 20, a quantity of the hydraulic liquid may be forced into hydraulic liquid reservoir 16 from actuator chamber 13 (block 180). For example, all rigid reservoir valves 22 may be closed, hydraulic reservoir valve 18 may be opened, and piston 14 may be moved in distal direction 40. The quantity may be sufficient to decrease the volume of hydraulic liquid in actuator chamber 13 to a required or desired volume.

If or when the volume of hydraulic liquid in actuator chamber 13 is sufficiently low, rigid reservoir valves 22 of selected rigid reservoirs 20 to which hydraulic liquid is to be delivered may be opened (block 185).

Hydraulic actuator 12 may then be operated (e.g., piston 14 may be moved in proximal direction 42), so as to draw delivery liquid into the selected rigid reservoirs 20 (block 190).

Different embodiments are disclosed herein. Features of certain embodiments may be combined with features of other embodiments; thus certain embodiments may be combinations of features of multiple embodiments. The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A system comprising:
    a plurality of rigid reservoirs, an interior space of each of the rigid reservoirs being divided by a flexible diaphragm into a hydraulic chamber and a delivery chamber, the hydraulic chamber being connected to a hydraulic liquid conduit via a valve, the delivery chamber being connected to a delivery conduit, the diaphragm being impermeable to a hydraulic liquid for filling the hydraulic chamber and to a delivery liquid for filling the delivery chamber; and a hydraulic actuator that is operable to apply pressure to the hydraulic liquid in the hydraulic liquid conduit so as to force the hydraulic liquid into the hydraulic chamber of a rigid reservoir of said plurality of rigid reservoirs whose valve is open so as to push the flexible diaphragm of that rigid reservoir distally to force the delivery liquid from the delivery chamber of that rigid reservoir into the connected delivery conduit, and that is operable to apply suction to the hydraulic liquid in the hydraulic liquid conduit so as to draw the hydraulic liquid from the hydraulic chamber of that rigid reservoir whose valve is open so as to proximally pull the flexible diaphragm of that rigid chamber to draw the delivery liquid from the connected delivery conduit into the delivery chamber of that rigid reservoir, wherein the delivery conduit is connected via a check valve to a destination component of the system.

2. A system comprising:

a plurality of rigid reservoirs, an interior space of each of the rigid reservoirs being divided by a flexible diaphragm into a hydraulic chamber and a delivery chamber, the hydraulic chamber being connected to a hydraulic liquid conduit via a valve, the delivery chamber being connected to a delivery conduit, the diaphragm being impermeable to a hydraulic liquid for filling the hydraulic chamber and to a delivery liquid for filling the delivery chamber; and a hydraulic actuator that is operable to apply pressure to the hydraulic liquid in the hydraulic liquid conduit so as to force the hydraulic liquid into the hydraulic chamber of a rigid reservoir of said plurality of rigid reservoirs whose valve is open so as to push the flexible diaphragm of that rigid reservoir distally to force the delivery liquid from the delivery chamber of that rigid reservoir into the connected delivery conduit, and that is operable to apply suction to the hydraulic liquid in the hydraulic liquid conduit so as to draw the hydraulic liquid from the hydraulic chamber of that rigid reservoir whose valve is open so as to proximally pull the flexible diaphragm of that rigid chamber to draw the delivery liquid from the connected delivery conduit into the delivery chamber of that rigid reservoir, wherein the delivery conduit is connected via a check valve to a source of the delivery liquid.

3. A system comprising:

a plurality of rigid reservoirs, an interior space of each of the rigid reservoirs being divided by a flexible diaphragm into a hydraulic chamber and a delivery chamber, the hydraulic chamber being connected to a hydraulic liquid conduit via a valve, the delivery chamber being connected to a delivery conduit, the diaphragm being impermeable to a hydraulic liquid for filling the hydraulic chamber and to a delivery liquid for filling the delivery chamber; and a hydraulic actuator that is operable to apply pressure to the hydraulic liquid in the hydraulic liquid conduit so as to force the hydraulic liquid into the hydraulic chamber of a rigid reservoir of said plurality of rigid reservoirs whose valve is open so as to push the flexible diaphragm of that rigid reservoir distally to force the delivery liquid from the delivery chamber of that rigid reservoir into the connected delivery conduit, and that is operable to apply suction to the hydraulic liquid in the hydraulic liquid conduit so as to draw the hydraulic liquid from the hydraulic chamber of that rigid reservoir whose valve is open so as to proximally pull the flexible diaphragm of that rigid chamber to draw the delivery liquid from the connected delivery conduit into the delivery chamber of that rigid reservoir, wherein the delivery conduit includes a gas removal assembly.

4. The system of claim 3, wherein the gas removal assembly includes a gas removal component that is permeable to a gas to be removed and impermeable to the delivery liquid.

5. The system of claim 3, wherein the valve includes a solenoid that is operable to open or close the valve.

* * * * *